(No Model.)
F. B. HERZOG.
THILL COUPLING.
No. 282,080. Patented July 31, 1883.
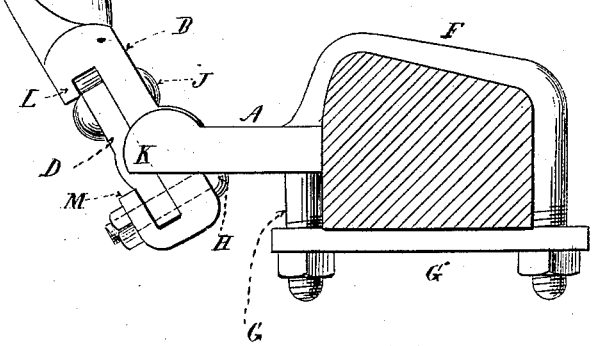
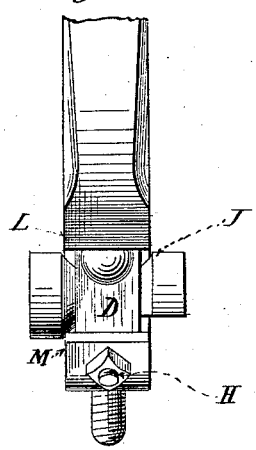
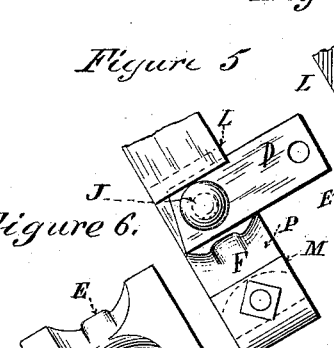
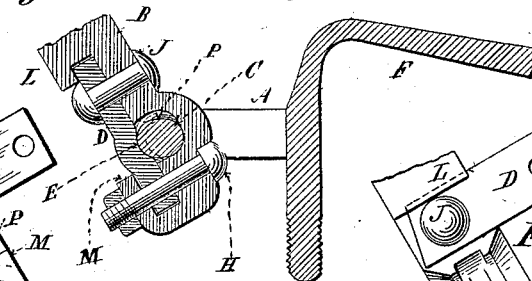
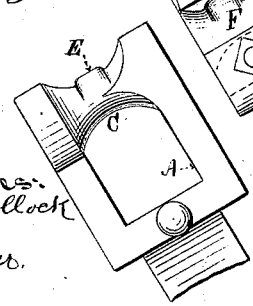
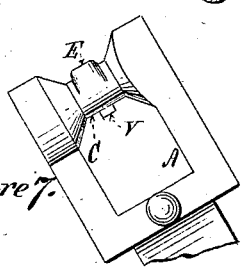
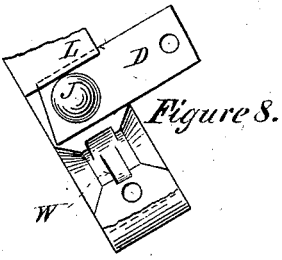
Witnesses:
Wm. A. Pollock
Wm. Gardner.
Inventor:
F. Benedict Herzog
By his Attorney
E. N. Dickerson Jr.
N. PETERS. Photo-Lithographer, Washington, D. C.

UNITED STATES PATENT OFFICE.

F. BENEDICT HERZOG, OF NEW YORK, N. Y., ASSIGNOR OF ONE-HALF TO JAMES ORIN NOAKES, OF SAME PLACE.

THILL-COUPLING.

SPECIFICATION forming part of Letters Patent No. 282,080, dated July 31, 1883.

Application filed March 17, 1883. (No model.)

*To all whom it may concern:*

Be it known that I, F. BENEDICT HERZOG, of the city, county, and State of New York, have invented a new and useful Improvement in Thill-Couplings, of which the following is a full, true, and exact description, reference being had to the accompanying drawings.

My invention relates to a thill-coupling in which no leather, rubber, or similar contrivance is used, and in which the parts, when in use, are automatically locked and are not liable to become loosened in any way, thereby preventing the necessity of the straps now usually employed to prevent accident in case of the breaking of the coupling contrivance. The elevation of the shafts or pole, as the case may be, in this contrivance automatically locks the parts together and prevents their separating.

My invention will be readily understood from the accompanying drawings, in which Figure 1 represents a general view, partly in section, of my contrivance; Fig. 2, a view of the locking contrivance in Fig. 1, looking at it from the under side; Figs. 3 and 4, a vertical section through Fig. 1; Figs. 5 and 8, bottom views of my locking contrivance; Figs. 6 and 7, views of the connecting-bar with which the coupling engages.

Similar letters refer to similar parts in all the figures.

A represents a bar or connection to be fastened to the draft-bar of the wagon. This buckle is preferably forged in one piece. The front end or cross connecting-bar (marked C) may be either of the shape shown in Fig 6 or the shape shown in Fig. 7. A swelling or extension of this bar is shown at the forward side. (Marked E.)

B represents the part of the coupling connected with the thill; and it consists generally of a hook-shaped portion having a cavity for the reception of the bar C. Two hook-like projections, L and M, are shown, with which the lock-plate D engages when the coupling is closed. This lock-plate is permanently pivoted to the apparatus by the pivot J, and can be swung laterally around this pivot or rivet to allow the placing of the coupling in position, as shown in Fig. 5. The chamber P in the piece B is provided with a recess for the reception of the swelling or extension E shown in Fig. 6. The lock-plate D is locked in position by the screw-bolt H when it has been placed beneath the bar C.

The manner of placing my coupling in position can now be readily understood. The parts being in the position shown in Fig. 5, the coupling is placed around the bolt c, (shown in Fig. 6,) and the plate D swung into position beneath the lip M and the screw-bolt H passed through it and drawn tight by a suitable lock-nut. This operation must be done when the thill is lowered, so as to enable the plate D to pass beneath the corner K of the part A. As soon as the thill is raised, as shown in Fig. 1, the corners K pass downward on both sides of the plate D, thereby locking it in position. From this it follows that when the parts are in position and the thill is raised and attached to the horse, they cannot possibly become disengaged, the use of the screw-bolt H being merely to hold the parts together when the vehicle is not in use. It will be seen that the ellipsoidal shape of the bar C causes the said bar to jam in the cavity P when the thill is raised. By this means a tight connection is made, insuring the absence of any rattle. The parts are prevented from having any loss of motion laterally by the engagement of the extension D in the cavity W.

This coupling is cheap, simple, and efficacious, and absolutely safe, for, unlike the ordinary coupling, it is not dependent upon the proper position of a nut upon a screw.

It will be readily seen that the position of the parts may, if desired, be reversed; also, in practice, as shown in Fig. 2, the part A is so arranged that the plate D can only be slipped out on one side, the other being circular. Only one side, K, is in practice cut off to allow such removal.

What I claim as my invention, and desire to secure by Letters Patent, is—

1. A thill-coupling consisting of a bar, a suitable chamber for receiving said bar, and a locking device permanently pivoted to the wall of the chamber, and mechanism for automatically preventing the withdrawal of said locking device when the thill is raised, substantially as described.

2. The combination of the bar C, chamber P, and pivoted locking-plate D, substantially as described.

3. The combination of the elliptical bar E, chamber P, and locking-plate D, substantially as described.

4. The combination of the bar C, coupling B, provided with chamber P, locking-plate D, and the hook portions L and M, engaging with locking-plate D, permanently pivoted within the hook M, substantially as described.

5. The combination of the bolt C, coupling B, provided with chamber P, and pivoted locking-plate D, permanently attached to the coupling by a pivot, J, or equivalent device, and capable of being locked in position by the bolt H, substantially as described.

6. The combination of coupling B, provided with chamber P, bar C, plate D, permanently pivoted within the hook M, and the projections K for locking the plate D in position when the thill is raised, substantially as described.

7. The combination of the buckle A, provided with bar C, and double-coned extensions on either end of said bar, with coupling B, provided with locking-plate D, for the purpose of centering said coupling on the bar C, substantially as described.

8. The combination of the buckle A, provided with feather V, and coupling B, provided with pins W for the reception of the feather V when in position, substantially as described.

F. BENEDICT HERZOG.

Witnesses:
ANTHONY GREF, Jr.,
WILLIAM A. POLLOCK.